United States Patent
Han et al.

(10) Patent No.: US 9,885,916 B2
(45) Date of Patent: Feb. 6, 2018

(54) MANUFACTURING METHOD OF LIQUID CRYSTAL DISPLAY PANEL

(71) Applicant: SHENZHEN CHINA STAR OPTOELECTRONICS TECHNOLOGY CO., LTD, Shenzhen (CN)

(72) Inventors: Bing Han, Shenzhen (CN); Caiqin Chen, Shenzhen (CN)

(73) Assignee: SHENZHEN CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 353 days.

(21) Appl. No.: 14/401,536

(22) PCT Filed: Oct. 14, 2014

(86) PCT No.: PCT/CN2014/088551
§ 371 (c)(1),
(2) Date: Nov. 17, 2014

(87) PCT Pub. No.: WO2016/054831
PCT Pub. Date: Apr. 14, 2016

(65) Prior Publication Data
US 2016/0282671 A1    Sep. 29, 2016

(30) Foreign Application Priority Data

Oct. 11, 2014    (CN) .......................... 2014 1 0532505

(51) Int. Cl.
*G02F 1/1337* (2006.01)
*G02F 1/1335* (2006.01)
(Continued)

(52) U.S. Cl.
CPC ...... *G02F 1/133711* (2013.01); *G02F 1/1341* (2013.01); *G02F 1/13439* (2013.01);
(Continued)

(58) Field of Classification Search
CPC ............. G02F 1/133711; G02F 1/1341; G02F 1/13439; G02F 1/133788; G02F 1/133514; G02F 2001/133726
(Continued)

(56) References Cited

U.S. PATENT DOCUMENTS 5,543,943 A    8/1996  Hanyu et al.
6,069,605 A    5/2000  Ozawa
(Continued)

FOREIGN PATENT DOCUMENTS

CN    1138904 A     12/1996
CN    101738808 A    6/2010
(Continued)

*Primary Examiner* — Charles Chang
(74) *Attorney, Agent, or Firm* — Mark M. Friedman

(57) ABSTRACT

The present invention proposes a manufacturing method of a liquid crystal display panel. The method includes: injecting liquid crystal molecules having monomers into a liquid crystal box; detecting an alternating-current deflection voltage between a transparent electrode of an array substrate and a transparent electrode of a color filter substrate in connection areas of the liquid crystal display panel; applying the alternating-current deflection voltage between the transparent electrode of the array substrate and the transparent electrode of the color filter substrate when values of the alternating-current deflection voltage are all equal to a setting value; irradiating the liquid crystal display panel to form the polymer alignment films.

13 Claims, 3 Drawing Sheets

(51) Int. Cl.
*G02F 1/1341* (2006.01)
*G02F 1/1343* (2006.01)

(52) U.S. Cl.
CPC .. *G02F 1/133514* (2013.01); *G02F 1/133788* (2013.01); *G02F 2001/133726* (2013.01)

(58) Field of Classification Search
USPC ............................................................ 349/88
See application file for complete search history.

(56) References Cited

U.S. PATENT DOCUMENTS

| | | | | |
|---|---|---|---|---|
| 2003/0001809 | A1* | 1/2003 | Hattori | G02F 1/134336 345/87 |
| 2013/0314656 | A1 | 11/2013 | Ma et al. | |
| 2013/0335655 | A1* | 12/2013 | Chen | G02F 1/1345 349/41 |
| 2014/0307211 | A1* | 10/2014 | Suwa | G02F 1/133711 349/123 |
| 2014/0333879 | A1* | 11/2014 | Noma | C09K 19/12 349/124 |

FOREIGN PATENT DOCUMENTS

| | | |
|---|---|---|
| CN | 101968589 A | 2/2011 |
| CN | 102662274 A | 9/2012 |
| EP | 0553727 A2 | 8/1993 |

\* cited by examiner

MANUFACTURING METHOD OF LIQUID CRYSTAL DISPLAY PANEL

BACKGROUND OF THE INVENTION

1. Field of the Invention

The present invention relates to a display area, more particularly, to a manufacturing method of a liquid crystal display panel.

2. Description of the Related Art

The now existing vertical alignment technology is to apply a voltage to an array substrate, a color filter substrate, and liquid crystal sealed between the array substrate and the color filter substrate so as to allow liquid crystal molecules to form a pre-tilt angle. The liquid crystal comprises monomer liquid crystal molecules. In addition, when the liquid crystal display panel is irradiated with ultraviolet rays, polymer alignment films are respectively formed on the array substrate and the color filter substrate.

However, during the voltage application process, only one connection area is connected to the voltage source used for supplying the voltage, and the other connection areas are connected to the voltage source via wires. Therefore, the farther the distance between the connection area and the voltage source is, the greater the loss of the voltage input to the color filter substrate is, thus causing undesirable phenomena such as dark fringes, color shift, when the liquid crystal display displays. As a result, the display effect of the liquid crystal display is affected.

It is therefore very important to provide a manufacturing method of a liquid crystal display panel so as to resolve the problems of the prior art.

SUMMARY OF THE INVENTION

It is an objective of the present invention to provide a manufacturing method of a liquid crystal display panel to solve the problem of poor display so as to improve the display effect.

In order to solve the above-mentioned problems, the present invention provides a technical solution as follows:

Another embodiment of the present invention provides a manufacturing method of a liquid crystal display panel. The liquid crystal display panel comprises an array substrate, a color filter substrate, and a liquid crystal layer disposed between the array substrate and the color filter substrate. Polymer alignment films for retaining a pre-tilt angle of liquid crystal molecules in the liquid crystal layer are disposed being disposed on an inner surface of the array substrate and an inner surface of the color filter substrate. The manufacturing method of the liquid crystal display panel comprises:

forming a liquid crystal box constituted by the array substrate and the color filter substrate, the liquid crystal molecules comprising monomers being injected into the liquid crystal box;

applying a common voltage to a transparent electrode of the array substrate, switches being respectively disposed between a transparent electrode of the color filter substrate in connection areas and an input source of an alternating-current deflection voltage to control whether to apply the alternating-current deflection voltage to the transparent electrode of the color filter substrate in the corresponding connection areas through the switches so as to allow the liquid crystal molecules to form the pre-tilt angle; and irradiating the liquid crystal display panel with ultraviolet rays to synthesize the monomers to polymers so as to form the polymer alignment films on the inner surface of the array substrate and the inner surface of the color filter substrate;

wherein the step of applying the alternating-current deflection voltage comprises:

detecting the alternating-current deflection voltage between the transparent electrode of the array substrate and the transparent electrode of the color filter substrate in the connection areas of the liquid crystal display panel; and applying the alternating-current deflection voltage between the transparent electrode of the array substrate and the transparent electrode of the color filter substrate when values of the alternating-current deflection voltage are all equal to a setting value;

wherein the alternating-current deflection voltage is an alternating-current square-wave signal.

According to the manufacturing method of the liquid crystal display panel, the switches are turned on to apply the alternating-current deflection voltage to the transparent electrode of the color filter substrate when the values of the alternating-current deflection voltage are all equal to the setting value;

the switches are turned off when at least one of the values of the alternating-current deflection voltage is not equal to the setting value so that the alternating-current deflection voltage is not applied to the transparent electrode.

According to the manufacturing method of the liquid crystal display panel, when the values of the alternating-current deflection voltage are positive:

the switches are turned on when the values of the alternating-current deflection voltage are all equal to a first setting value;

the switches are turned off when at least one of the values of the alternating-current deflection voltage is not equal to the first setting value.

According to the manufacturing method of the liquid crystal display panel, when the values of the alternating-current deflection voltage are negative:

the switches are turned on when the values of the alternating-current deflection voltage are all equal to a second setting value;

the switches are turned off when at least one of the values of the alternating-current deflection voltage is not equal to the second setting value.

According to the manufacturing method of the liquid crystal display panel, input terminals of the switches are connected to the input source of the alternating-current deflection voltage, output terminals of the switches are connected to the transparent electrode of the color filter substrate, control terminals of the switches are connected to a control signal.

According to the manufacturing method of the liquid crystal display panel, losses of the alternating-current deflection voltage in the connection areas are different, the control signal is generated based on the value of the alternating-current deflection voltage in the connection area which has the greatest loss.

According to the manufacturing method of the liquid crystal display panel, a material of the monomer is an alkenyl compound.

An embodiment of the present invention provides a manufacturing method of a liquid crystal display panel. The liquid crystal display panel comprises an array substrate, a color filter substrate, and a liquid crystal layer disposed between the array substrate and the color filter substrate. Polymer alignment films for retaining a pre-tilt angle of liquid crystal molecules in the liquid crystal layer are disposed being disposed on an inner surface of the array substrate and an inner surface of the color filter substrate. The manufacturing method of the liquid crystal display panel comprises:

forming a liquid crystal box constituted by the array substrate and the color filter substrate, the liquid crystal molecules comprising monomers being injected into the liquid crystal box;

applying an alternating-current deflection voltage between a transparent electrode of the array substrate and a transparent electrode of the color filter electrode to allow the liquid crystal molecules to form the pre-tilt angle; and irradiating the liquid crystal display panel with ultraviolet rays to synthesize the monomers to polymers so as to form the polymer alignment films on the inner surface of the array substrate and the inner surface of the color filter substrate;

wherein the step of applying the alternating-current deflection voltage comprises:

detecting the alternating-current deflection voltage between the transparent electrode of the array substrate and the transparent electrode of the color filter substrate in connection areas of the liquid crystal display panel; and applying the alternating-current deflection voltage between the transparent electrode of the array substrate and the transparent electrode of the color filter substrate when values of the alternating-current deflection voltage are all equal to a setting value.

According to the manufacturing method of the liquid crystal display panel, the step of applying the alternating-current deflection voltage between the transparent electrode of the array substrate and the transparent electrode of the color filter substrate comprises:

applying a common voltage to the transparent electrode of the array substrate, applying the alternating-current deflection voltage to the transparent electrode of the color filter substrate.

According to the manufacturing method of the liquid crystal display panel, the step of applying the alternating-current deflection voltage to the transparent electrode of the color filter substrate comprises:

disposing switches respectively between the transparent electrode of the color filter substrate in the connection areas and an input source of the alternating-current deflection voltage to control whether to apply the alternating-current deflection voltage to the transparent electrode of the color filter substrate in the corresponding connection areas through the switches.

According to the manufacturing method of the liquid crystal display panel, the switches are turned on to apply the alternating-current deflection voltage to the transparent electrode of the color filter substrate when the values of the alternating-current deflection voltage are all equal to the setting value;

the switches are turned off when at least one of the values of the alternating-current deflection voltage is not equal to the setting value so that the alternating-current deflection voltage is not applied to the transparent electrode.

According to the manufacturing method of the liquid crystal display panel, when the values of the alternating-current deflection voltage are positive:

the switches are turned on when the values of the alternating-current deflection voltage are all equal to a first setting value;

the switches are turned off when at least one of the values of the alternating-current deflection voltage is not equal to the first setting value.

According to the manufacturing method of the liquid crystal display panel, when the values of the alternating-current deflection voltage are negative:

the switches are turned on when the values of the alternating-current deflection voltage are all equal to a second setting value;

the switches are turned off when at least one of the values of the alternating-current deflection voltage is not equal to the second setting value.

According to the manufacturing method of the liquid crystal display panel, input terminals of the switches are connected to the input source of the alternating-current deflection voltage, output terminals of the switches are connected to the transparent electrode of the color filter substrate, control terminals of the switches are connected to a control signal.

According to the manufacturing method of the liquid crystal display panel, losses of the alternating-current deflection voltage in the connection areas are different, the control signal is generated based on the value of the alternating-current deflection voltage in the connection area which has the greatest loss.

According to the manufacturing method of the liquid crystal display panel, the alternating-current deflection voltage is an alternating-current square-wave signal.

According to the manufacturing method of the liquid crystal display panel, a material of the monomer is an alkenyl compound.

According to the present invention manufacturing method of the liquid crystal display panel, the magnitude of the input voltages on the transparent electrode of the color filter substrate is detected before applying the voltage. The voltage is not applied until the input voltages in the connection areas are all equal, thus eliminating the problem of poor display to improve the display effect.

The disclosed inventions will be described with references to the accompanying drawings, which show important example embodiments of the inventions and are incorporated in the specification hereof by related references.

DETAILED DESCRIPTION OF THE PREFERRED EMBODIMENTS

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures.

It is noted that the same components are labeled by the same number.

Figure 1:
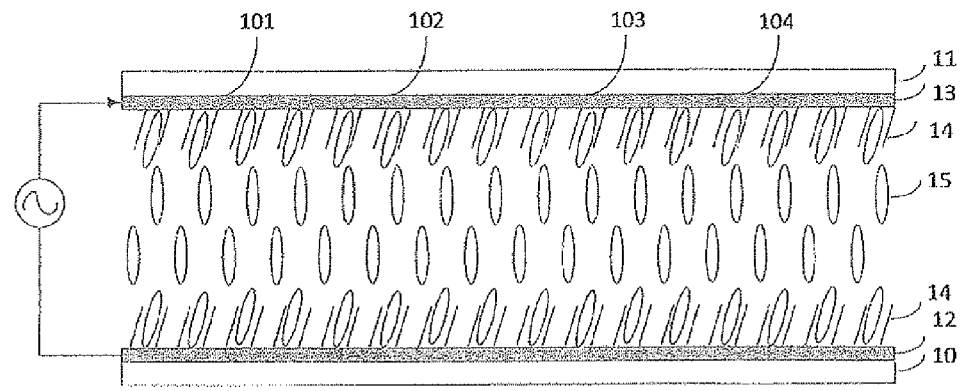
FIG. 1 is a schematic diagram showing a structure of a liquid crystal display panel according to the prior art.

Refer to FIG. 1, FIG. 1 is a schematic diagram showing a structure of a liquid crystal display panel according to the prior art.

The conventional liquid crystal display panel comprises an array substrate 10, a color filter substrate 11, and a liquid crystal layer disposed between the array substrate 10 and the color filter substrate 11. Polymer alignment films 14 are disposed on an inner surface of the array substrate 10 and an inner surface of the color filter substrate 11 for retaining a pre-tilt angle of liquid crystal molecules 15 in the liquid crystal layer. A manufacturing method of a liquid crystal display panel according to the prior art comprises:

forming a liquid crystal box constituted by the array substrate 10 and the color filter substrate 11, liquid crystal molecules comprising monomers being injected into the liquid crystal box;

applying an alternating-current deflection voltage between a transparent electrode 12 of the array substrate 10 and a transparent electrode 13 of the color filter substrate 11 to allow the liquid crystal molecules 15 to form a pre-tilt angle; and irradiating the liquid crystal display panel with ultraviolet rays to synthesize the monomers to polymers so as to form the polymer alignment films 14 on the inner surface of the array substrate 10 and the inner surface of the color filter substrate 11.

Divide the transparent electrode 13 of the color filter substrate 11 into a plurality of connection areas 101-104.

Figure 2:
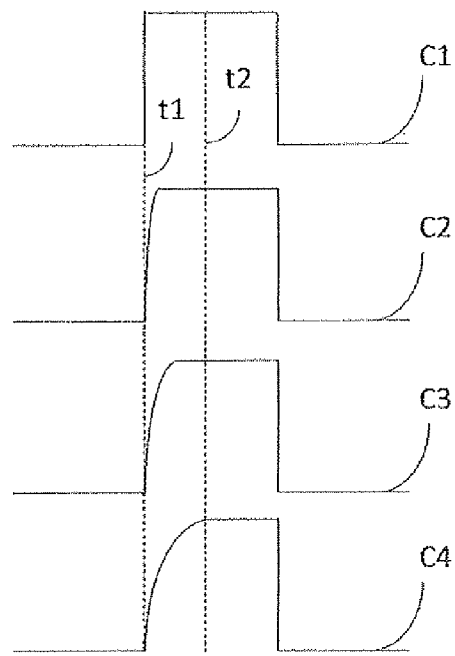
FIG. 2 is waveforms of an alternating-current deflection voltage input to various connection areas according to the prior art.

Usually, an alternating-current voltage source is only disposed on the array substrate 10 of the liquid crystal display panel. For example, electric power from the alternating-current voltage source on the array substrate 10 is transmitted to the color filter substrate 11 via a gold ball, and an output point of the alternating-current voltage source is usually located at one of the connection areas (for example 101) on the color filter substrate 11. Gold balls of the other connection areas 102-104 are electrically connected to the input alternating-current voltage source in the connection area 101 via connection wires. Since the farther the distance from the input alternating-current voltage source is, the longer the wire needs to be disposed, the farther the distance between the connection area and the input alternating-current voltage source is, the greater the loss of an alternating-current voltage input is when polarity changes. As shown in FIG. 2, when inputting a voltage having a same value from an alternating-current voltage source at a same time (t1), a voltage output waveform of the connection area 101 is C1, a voltage input waveform of the connection area 102 is C2, a voltage input waveform of the connection area 103 is C3, a voltage input waveform of the connection area 104 is C4. As shown in FIG. 2, voltages of C2, C3, C4 rise slowly until reaching a voltage value of an input voltage. At time t2, voltage values of the input alternating-current voltage of the connection areas are equal. Hence, the farther the distance between the connection area and the input voltage source is (the connection area 101), the greater the loss of the input alternating-current voltage is, correspondingly. As a result, the deflection angle of the liquid crystal molecules in the connection areas is inconsistent.

Figure 3:
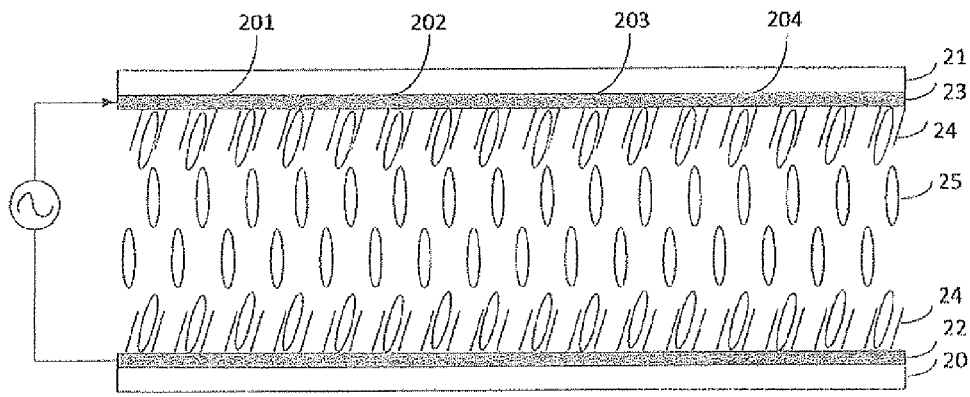
FIG. 3 is a schematic diagram showing a structure of a liquid crystal display panel according to the present invention.

Refer to FIG. 3, FIG. 3 is a schematic diagram showing a structure of a liquid crystal display panel according to the present invention.

A description is provided with reference to FIG. 3. A liquid crystal display panel according to the present invention comprises an array substrate 20, a color filter substrate 21, and a liquid crystal layer disposed between the array substrate 20 and the color filter substrate 21. Polymer alignment films 24 are disposed on an inner surface of the array substrate 20 and an inner surface of the color filter substrate 21 for retaining a pre-tilt angle of liquid crystal molecules 25 in the liquid crystal layer.

In order to achieve a better display effect, a transparent electrode 23 of the color filter substrate 21 is divided into a plurality of connection areas 201-204

A gold ball is disposed between each of the connection areas and the transparent electrode 22 of the array substrate 20. An output point of an alternating-current voltage source is usually located at one of the connection areas (for example 201) on the color filter substrate 21. Gold balls of the other connection areas 202-204 are electrically connected to the input alternating-current voltage source in the connection area 201 via connection wires.

Figure 4:
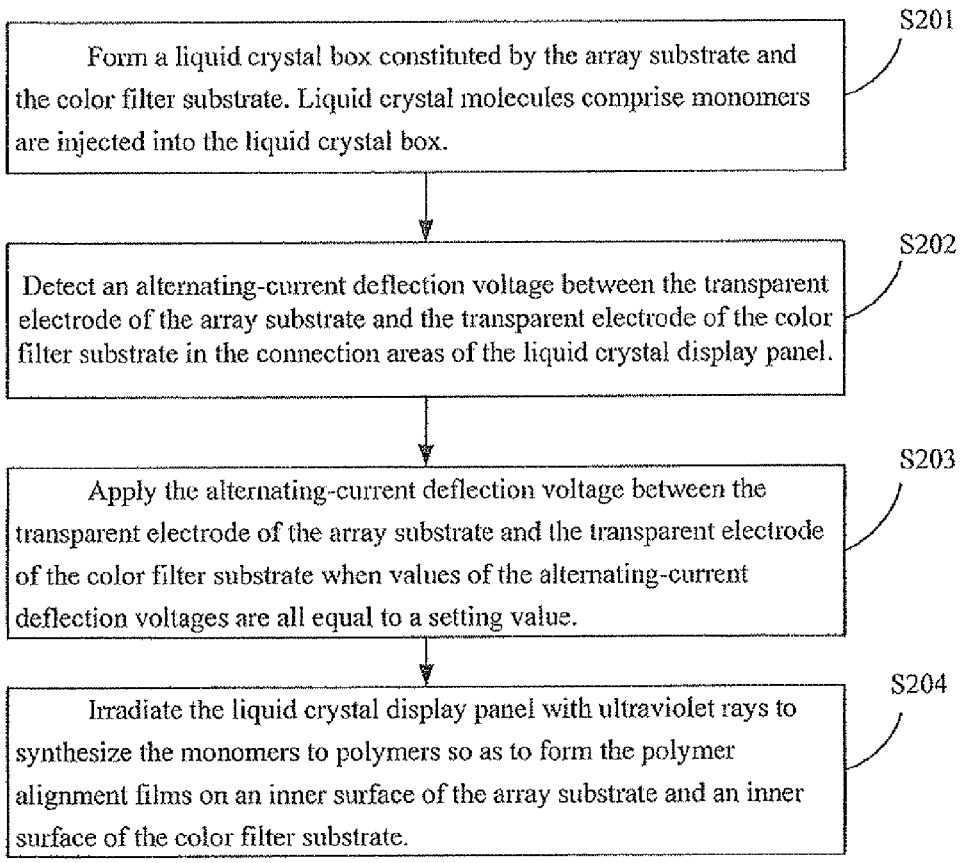
FIG. 4 is a flowchart of a manufacturing method of a liquid crystal display panel according to the present invention.

As shown in FIG. 4, a manufacturing method of a liquid crystal display panel according to the present invention comprises:

S201: forming a liquid crystal box constituted by the array substrate 20 and the color filter substrate 21, liquid crystal molecules comprising monomers being injected into the liquid crystal box.

A material of the monomer is an alkenyl compound. A liquid crystal alignment agent may further be injected into the liquid crystal box. The liquid crystal alignment agent is selected from at least one of the polymers consisting of polyamic acid, poly amic acid ester, polyimide, and polyorganosiloxane.

S202: detecting an alternating-current deflection voltage between the transparent electrode 22 of the array substrate 20 and the transparent electrode 23 of the color filter substrate 21 in the connection areas 201-204 of the liquid crystal display panel.

Through applying the alternating-current deflection voltage between the transparent electrode 22 of the array substrate 20 and the transparent electrode 23 of the color filter substrate 21, the liquid crystal molecules 25 are allowed to form a pre-tilt angle; and Preferably, apply a common voltage to the transparent electrode 22 of the array substrate 20. Apply the alternating-current deflection voltage to the transparent electrode 23 of the color filter substrate 21. The alternating-current deflection voltage is, for example, an alternating-current square-wave signal.

S203: applying the alternating-current deflection voltage between the transparent electrode 22 of the array substrate 20 and the transparent electrode 23 of the color filter substrate 21 when values of the alternating-current deflection voltages are all equal to a setting value.

Based on the detecting result of S202, determine whether to apply the alternating-current deflection voltage between the transparent electrode 22 of the array substrate 20 and the transparent electrode 23 of the color filter electrode 21. The setting value is a voltage value of an input source of the alternating-current deflection voltage.

S204: irradiating the liquid crystal display panel with ultraviolet rays to synthesize the monomers to polymers so as to form the polymer alignment films 24 on an inner surface of the array substrate 20 and an inner surface of the color filter substrate 21.

Step S203 may further comprise:

Preferably, disposing switches between the transparent electrode 23 of the color filter substrate 21 in the connection areas 201-204 and the input source of the alternating-current deflection voltage, respectively, so as to control whether to apply the alternating-current deflection voltage to the transparent electrode 23 of the color filter substrate 21 in the corresponding connection areas through the switches.

When the values of the alternating-current deflection voltage in the connection areas 201-204 are all equal to the setting value (the voltage value input by the input source of the alternating-current deflection voltage), the switches are turned on to apply the alternating-current deflection voltage to the transparent electrode 23 of the color filter substrate 21. When at least one of the values of the alternating-current deflection voltage is not equal to the setting value, the switches are turned off so that the alternating-current deflection voltage is not applied to the transparent electrode 23 of the color filter substrate 21.

When the values of the alternating-current deflection voltage are positive: call a positive amplitude value of the alternating-current deflection voltage as a first setting value. When the values of the alternating-current deflection voltage are all equal to the first setting value, the switches are turned on. When at least one of the values of the alternating-current deflection voltage is not equal to the first setting value, the switches are turned off.

When the values of the alternating-current deflection voltage are negative: call a negative amplitude value of the alternating-current deflection voltage as a second setting value. When the values of the alternating-current deflection voltage are all equal to the second setting value, the switches are turned on. When at least one of the values of the alternating-current deflection voltage is not equal to the second setting value, the switches are turned off.

Input terminals of the switches are connected to the input source of the alternating-current deflection voltage. Output terminals of the switches are connected to the transparent electrode 23 of the color filter substrate 21 via, for example, gold balls. Control terminals of the switches are connected to a control signal.

Since the losses of the alternating-current deflection voltage in the connection areas 201-204 are all different, the control signal can be generated based on the value of the alternating-current deflection voltage in the connection area which has the greatest loss. For example, the connection area 204 has the greatest loss of the alternating-current deflection voltage. When the value of the alternating-current deflection voltage in the connection area 204 is equal to the voltage value input by the input source of the alternating-current deflection voltage, switch on the switches in all of the connection areas 201-204.

Lengths of connection wires between the output terminals of the switches and the transparent electrode in the connection areas are equal. However, lengths of wires between the input terminals of the switches and the input source of the alternating-current deflection voltage are not equal. Hence, the problem of voltage losses in all the connection areas can be avoided only by switching on each of the switches when the voltage values of the voltage source at the input terminals of the switches are equal.

Specifically, detecting whether the values of the alternating-current deflection voltage at the input terminals of the switches are equal. When the voltage values are equal, switch on all of the switches. Because the input source of the alternating-current deflection voltage has input the alternating-current deflection voltage to the input terminals of the switches before the alternating-current deflection voltage is output to the transparent electrode 23 of the color filter substrate 21 in the connection areas 201-204, the values of the alternating-current deflection voltage at the input terminals of the switches are detected after a period of time to determine whether the values of the alternating-current deflection voltage are all equal.

When detecting voltages, the switches in the connection areas may be switched on first so as to reach the time that is required by the voltages input to the connection areas to reach to the setting value (that is, the delay time, such as the difference t2−t1 in FIG. 2). At this time, the switches in the connection areas are switched off. After the time inputting the alternating-current deflection voltage reaches the delay time, the switches are turned on again.

Figure 5:
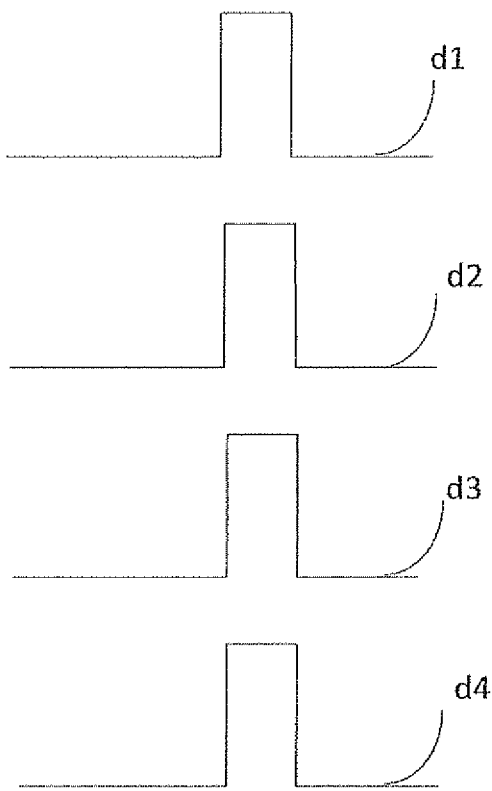
FIG. 5 is waveforms of an alternating-current deflection voltage input to various connection areas according to the present invention.

In the early stage, the alternating-current deflection voltage is first input to the input terminals of the switches through controlling the switches. After the values of the alternating-current deflection voltage at the input terminals of all the switches are equal, the alternating-current deflection voltage is then input to the transparent electrode in the connection areas. As a result, the problem of voltage losses caused by unequal wire lengths is well avoided to ensure that the deflection angle of the liquid crystal molecules is consistent. As shown in FIG. 5, a voltage output waveform of the connection area 201 is d1, a voltage input waveform of the connection area 202 is d2, a voltage input waveform of the connection area 203 is d3, a voltage input waveform of the connection area 204 is d4. As shown in FIG. 5, the waveforms d1-d4 are consistent. Hence, the problem of loss of the alternating-current deflection voltage does not exist so that the deflection angle of the liquid crystal molecules in the liquid crystal display panel is consistent.

According to the present invention manufacturing method of the liquid crystal display panel, the magnitude of the input voltages on the transparent electrode of the color filter substrate is detected before applying the voltage. The voltage is not applied until the input voltages in the connection areas are all equal, thus eliminating the problem of poor display to improve the display effect.

The present disclosure is described in detail in accordance with the above contents with the specific preferred examples. However, this present disclosure is not limited to the specific examples. For the ordinary technical personnel of the technical field of the present disclosure, on the premise of keeping the conception of the present disclosure, the technical personnel can also make simple deductions or replacements, and all of which should be considered to belong to the protection scope of the present disclosure.

What is claimed is:

1. A manufacturing method of a liquid crystal display panel, the liquid crystal display panel comprising an array substrate, a color filter substrate, and a liquid crystal layer disposed between the array substrate and the color filter substrate, polymer alignment films for retaining a pre-tilt angle of liquid crystal molecules in the liquid crystal layer being disposed on an inner surface of the array substrate and an inner surface of the color filter substrate, the manufacturing method comprising:

forming a liquid crystal box constituted by the array substrate and the color filter substrate, the liquid crystal molecules comprising monomers being injected into the liquid crystal box;

applying a common voltage to a transparent electrode of the array substrate, wherein a transparent electrode of the color filter substrate is divided into a plurality of connection areas; switches are respectively disposed between the plurality of connection areas of the transparent electrode of the color filter substrate and an input source of an alternating-current deflection voltage to control whether to apply the alternating-current deflection voltage to the transparent electrode of the color filter substrate in the corresponding connection areas through the switches so as to allow the liquid crystal molecules to form the pre-tilt angle; and irradiating the liquid crystal display panel with ultraviolet rays to synthesize the monomers to polymers so as to form the polymer alignment films on the inner surface of the array substrate and the inner surface of the color filter substrate;

wherein the step of applying the alternating-current deflection voltage comprises:

detecting the alternating-current deflection voltage between the transparent electrode of the array substrate and the transparent electrode of the color filter substrate in the connection areas of the liquid crystal display panel; and applying the alternating-current deflection voltage between the transparent electrode of the array substrate and the transparent electrode of the color filter substrate when values of the alternating-current deflection voltage are all equal to a setting value;

wherein the alternating-current deflection voltage is an alternating-current square-wave signal, wherein the switches are turned on to apply the alternating-current deflection voltage to the transparent electrode of the color filter substrate when the values of the alternating-current deflection voltage are all equal to the setting value;

the switches are turned off when at least one of the values of the alternating-current deflection voltage is not equal to the setting value so that the alternating-current deflection voltage is not applied to the transparent electrode.

2. The manufacturing method of the liquid crystal display panel as claimed in claim 1, wherein when the values of the alternating-current deflection voltage are positive:

the switches are turned on when the values of the alternating-current deflection voltage are all equal to a first setting value;

the switches are turned off when at least one of the values of the alternating-current deflection voltage is not equal to the first setting value.

3. The manufacturing method of the liquid crystal display panel as claimed in claim 1, wherein when the values of the alternating-current deflection voltage are negative:

the switches are turned on when the values of the alternating-current deflection voltage are all equal to a second setting value;

the switches are turned off when at least one of the values of the alternating-current deflection voltage is not equal to the second setting value.

4. The manufacturing method of the liquid crystal display panel as claimed in claim 1, wherein input terminals of the switches are connected to the input source of the alternating-current deflection voltage, output terminals of the switches are connected to the transparent electrode of the color filter substrate, control terminals of the switches are connected to a control signal.

5. The manufacturing method of the liquid crystal display panel as claimed in claim 4, wherein losses of the alternating-current deflection voltage in the connection areas are different, the control signal is generated based on the value of the alternating-current deflection voltage in the connection area which has the greatest loss.

6. The manufacturing method of the liquid crystal display panel as claimed in claim 1, wherein a material of the monomer is an alkenyl compound.

7. A manufacturing method of a liquid crystal display panel, the liquid crystal display panel comprising an array substrate, a color filter substrate, and a liquid crystal layer disposed between the array substrate and the color filter substrate, polymer alignment films for retaining a pre-tilt angle of liquid crystal molecules in the liquid crystal layer being disposed on an inner surface of the array substrate and an inner surface of the color filter substrate, the manufacturing method comprising:

forming a liquid crystal box constituted by the array substrate and the color filter substrate, the liquid crystal molecules comprising monomers being injected into the liquid crystal box;

applying a common voltage to a transparent electrode of the array substrate, and applying an alternating-current deflection voltage to a transparent electrode of the color filter substrate to allow the liquid crystal molecules to form the pre-tilt angle, wherein switches are disposed between the transparent electrode of the color filter substrate in connection areas and an input source of the alternating-current deflection voltage to control whether to apply the alternating-current deflection voltage to the transparent electrode of the color filter substrate in the corresponding connection areas through the switches; the switches are turned off when at least one of the values of the alternating-current deflection voltage is not equal to the setting value so that the alternating-current deflection voltage is not applied to the transparent electrode; and irradiating the liquid crystal display panel with ultraviolet rays to synthesize the monomers to polymers so as to form the polymer alignment films on the inner surface of the array substrate and the inner surface of the color filter substrate;

wherein the step of applying the alternating-current deflection voltage comprises:

detecting the alternating-current deflection voltage between the transparent electrode of the array substrate and the transparent electrode of the color filter substrate in connection areas of the liquid crystal display panel;

applying the alternating-current deflection voltage between the transparent electrode of the array substrate and the transparent electrode of the color filter substrate when values of the alternating-current deflection voltage are all equal to a setting value;

wherein a transparent electrode of the color filter substrate is divided into a plurality of connection areas; switches are respectively disposed between the plurality of connection areas of the transparent electrode of the color filter substrate and an input source of an alternating-current deflection voltage to control whether to apply the alternating-current deflection voltage to the transparent electrode of the color filter substrate in the corresponding connection areas through the switches so as to allow the liquid crystal molecules to form the pre-tilt angle.

8. The manufacturing method of the liquid crystal display panel as claimed in claim 7, wherein when the values of the alternating-current deflection voltage are positive:

the switches are turned on when the values of the alternating-current deflection voltage are all equal to a first setting value;

the switches are turned off when at least one of the values of the alternating-current deflection voltage is not equal to the first setting value.

9. The manufacturing method of the liquid crystal display panel as claimed in claim 7, wherein when the values of the alternating-current deflection voltage are negative:
- the switches are turned on when the values of the alternating-current deflection voltage are all equal to a second setting value;
- the switches are turned off when at least one of the values of the alternating-current deflection voltage is not equal to the second setting value.

10. The manufacturing method of the liquid crystal display panel as claimed in claim 7, wherein input terminals of the switches are connected to the input source of the alternating-current deflection voltage, output terminals of the switches are connected to the transparent electrode of the color filter substrate, control terminals of the switches are connected to a control signal.

11. The manufacturing method of the liquid crystal display panel as claimed in claim 10, wherein losses of the alternating-current deflection voltage in the connection areas are different, the control signal is generated based on the value of the alternating-current deflection voltage in the connection area which has the greatest loss.

12. The manufacturing method of the liquid crystal display panel as claimed in claim 7, wherein the alternating-current deflection voltage is an alternating-current square-wave signal.

13. The manufacturing method of the liquid crystal display panel as claimed in claim 7, wherein a material of the monomer is an alkenyl compound.

* * * * *